United States Patent [19]

Sato et al.

[11] 4,155,006

[45] May 15, 1979

[54] DRIVER CIRCUIT FOR A SOLID-STATE IMAGING DEVICE

[75] Inventors: Kazuhiro Sato, Tokyo; Hideo Onodera, Miyagi; Shusaku Nagahara, Hachioji, all of Japan

[73] Assignees: Hitachi, Ltd.; Hitachi Denshi Kabushiki Kaisha, both of Japan

[21] Appl. No.: 867,489

[22] Filed: Jan. 6, 1978

[30] Foreign Application Priority Data

Jan. 19, 1977 [JP] Japan .................................. 52-3933

[51] Int. Cl.² ............................................. H01J 39/12
[52] U.S. Cl. .............................. 250/211 J; 250/578; 357/32; 358/213
[58] Field of Search ....................... 357/30, 31, 32, 24; 250/211 R, 211 J, 578; 358/212, 213

[56] References Cited

U.S. PATENT DOCUMENTS

| | | | |
|---|---|---|---|
| 3,683,193 | 8/1972 | Weimer | 357/32 |
| 3,946,151 | 3/1976 | Kamiyama et al. | 358/213 |
| 4,067,046 | 1/1978 | Nakatani et al. | 250/211 J |

*Primary Examiner*—David C. Nelms
*Attorney, Agent, or Firm*—Craig & Antonelli

[57] ABSTRACT

In a solid-state imaging device having photodiodes which are arrayed in the form of a matrix, horizontal output switches and vertical output switches are selectively closed in order to sequentially detect signals stored in the photodiodes, and a horizontal shift register and a vertical shift register supply switching pulses to the switches. A common potential line of both the shift registers is held at a predetermined D. C. potential with respect to ground potential, whereby the dynamic range of the photodiodes is expanded.

4 Claims, 5 Drawing Figures

DRIVER CIRCUIT FOR A SOLID-STATE IMAGING DEVICE

BACKGROUND OF THE INVENTION

This invention relates to a solid-state imaging device which is used for an optical character reader, a device, etc. More particularly, it relates to a driver circuit which can expand the dynamic range (the range of the quantity of light) of photodiodes in the solid-state imaging device.

A MOS type imaging device comprises a large number of photodiodes arrayed in the form of a matrix, and a circuit for detecting charges stored in the photodiodes. Each photodiode has a parasitic capacitance. When no light is incident on the diode, the parasitic capacitance is held at a potential substantially equal to the applied supply voltage. When light falls on the photodiode, a current flows, and stored charges in the parasitic capacitance are neutralized according to the magnitude of the current, with the result that the potential of the capacitance changes. By sensing the change of the potential, accordingly, the quantity of light having come into incidence on the photodiode can be converted into an electric signal corresponding to that quantity. In order to widen to the utmost the range of the quantity of light to be photoelectrically converted, i.e., the dynamic range of the photodiode, a voltage which is applied across terminals of the photodiode may be made great to increase the quantity of charges which are stored in the parasitic capacitance of the diode. Since, however, the voltage to be fed to the photodiode is applied through a switching element of a MOS transistor from a D.C. power source, it is limited by the threshold voltage of the transistor.

SUMMARY OF THE INVENTION

An object of this invention is to provide a driver circuit for a photodiode imaging device which is capable of expanding the dynamic range of the photodiodes.

Another object of this invention is to expand the dynamic range of photodiodes in an imaging device without increasing spiky noises and by the use of a comparatively simple circuit arrangement.

In order to accomplish these objects, this invention provides for a D.C. power source to be inserted between ground and a common line (ground line) of shift registers for generating scanning pulses to be impressed on a photodiode array, thereby to shift the potential level of the common line by a predetermined potential from the earth.

The other objects, features and advantages of the present invention will become clearer from the following description when read in conjunction with the accompanying drawings.

DETAILED DESCRIPTION OF THE PREFERRED EMBODIMENTS

For better understanding of this invention, a metal-oxide-semiconductor (hereunder, abbreviated to "MOS") type solid-state imaging device will be described with reference to FIG. 1. Although, in the figure, a matrix array of photodiodes in 4 rows and 4 columns is shown in order to simplify the description, it is a matter of course that it can be amplified to m rows and n columns (m, n: any integers) in practice.

The MOS type imaging device comprises a photodiode array 2 in the form of a matrix, and a horizontal shift register $1_H$ forming a horizontal scanning circuit as well as a vertical shift register $1_V$ forming a vertical scanning circuit. Output pulses from the first stage $1_{H1}$, second stage $1_{H2}$, third stage $1_{H3}$ . . . of the horizontal shift register $1_H$ are respectively impressed on the gates of MOS type field effect transistors (hereunder, abbreviated to "MOS FET's") 41, 42, 43 . . . which form horizontal output switches. During the period during which the output pulse is impressed, the switch is in the conductive state. On the other hand, an output from the first stage $1_{V1}$ of the vertical shift register $1_V$ is impressed on the gates of MOS FET's $3_{11}$, $3_{12}$, $3_{13}$ . . . forming vertical output switches, and an output from the second stage $1_{V2}$ is impressed on MOS FET's $3_{21}$, $3_{22}$, $3_{23}$ . . . . Similarly, outputs from the succeeding stages of the vertical shift register $1_V$ are connected to vertical output switches which are arrayed in rows corresponding to the respective stages.

In such an arrangement, in the case where a photodiode $2_{11}$, for example, is selected, the output pulses are generated from the first stage $1_{H1}$ of the horizontal shift register $1_H$ and the first stage $1_{V1}$ of the vertical shift register $1_V$, whereby the switches 41 and $3_{11}$ are switched into the conductive state, respectively. As a result, charges stored in the photodiode $2_{11}$ are detected by a load circuit, consisting of a resistor 5 and a power source 6, through the switches $3_{11}$ and 41.

Accordingly, a signal corresponding to an optical image on the array can be taken out in such a way that the photodiode array is scanned in the horizontal and vertical directions by the output pulses of the horizontal shift register and the vertical shift register.

Figure 2:
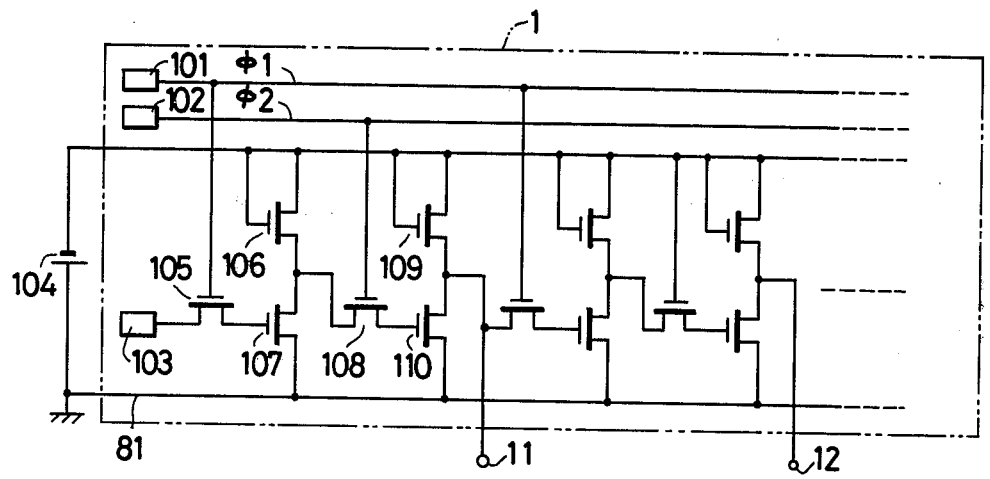
FIG. 2 is a schematic circuit diagram showing an example of a shift register in the device of FIG. 1.

FIG. 2 shows a specific example of a circuit arrangement of the horizontal shift register and the vertical shift register. Referring to the figure, numeral 101 designates a first clock pulse source which generates clock pulses $\phi_1$, numeral 102 a second clock pulse source which generates clock pulses $\phi_2$ differing in phase from the clock pulses $\phi_1$, and numeral 103 an input pulse source. When the clock pulse $\phi_1$ is impressed on a first MOS FET 105, an input pulse from pulse source 103 is applied to the gate of a second MOS FET 107 through this MOS FET 105. The second MOS FET 107 and a third MOS FET 106 form an inverter circuit. The pulse obtained from the drain of the second MOS FET 107 is further applied to a fourth MOS FET 108. When the clock pulse $\phi_2$ is impressed on the gate of the MOS FET 108, the inverted input pulse is transmitted through the source-drain circuit thereof and is applied to the gate of a fifth MOS FET 110. The fifth MOS FET 110 and a sixth MOS FET 109 form a second inverter circuit, so that an output pulse with its phase inverted with respect to the gate input of the MOS FET 110 is derived from a first output terminal 11. In this way, shift pulses are sequentially taken out from output terminals 11, 12, . . .

in synchronism with the clock pulses $\phi_2$. Numeral 104 indicates a supply voltage of the shift register.

Of course, the shift register 1 illustrated in FIG. 2 represents a mere example of a type of shift register capable of use as the scanning circuit in an imaging device embodying this invention. It is apparent that other various types of shift registers can be employed.

Figure 1:
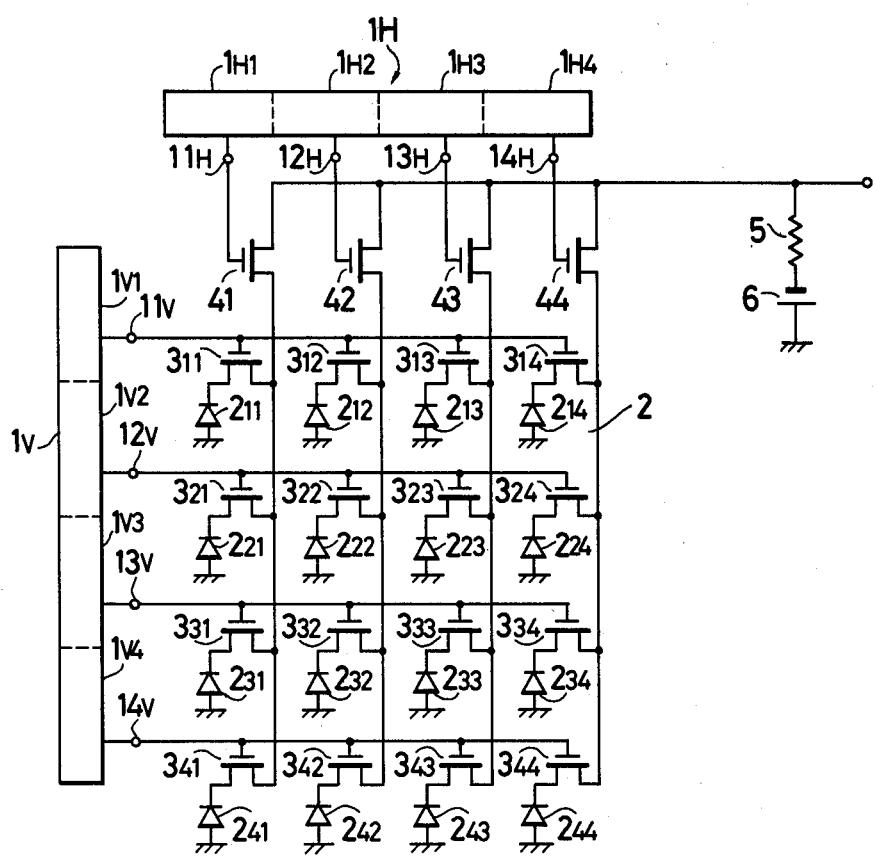
FIG. 1 is a schematic circuit diagram for explaining an example of a solid-state imaging device.
Figure 3:
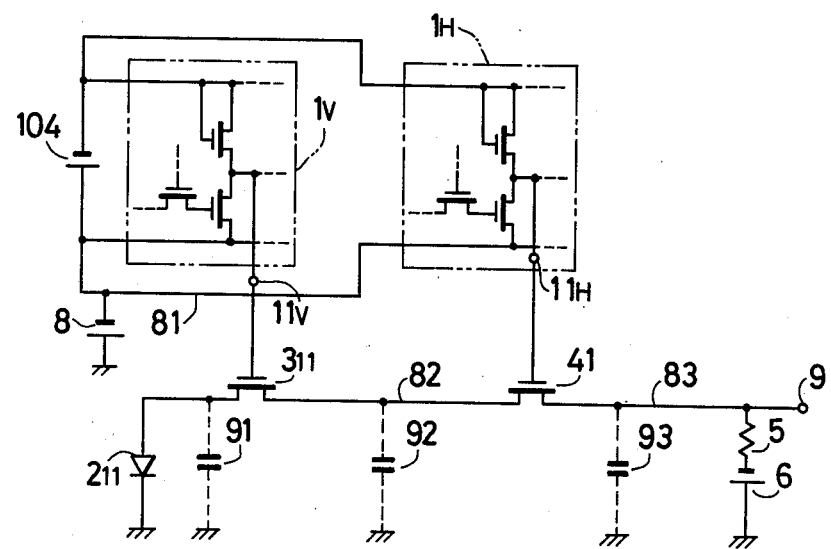
FIG. 3 is a schematic circuit diagram for explaining an embodiment of this invention.

FIG. 3 is a circuit diagram showing an embodiment of this invention, in which the same constituent parts as in FIGS. 1 and 2 are assigned the same numerals. For the sake of convenience in illustration, FIG. 3 shows only one photodiode $2_{11}$ as well as the vertical output switch $3_{11}$ and the horizontal output switch 41 which are connected thereto, and the first stage of the vertical shift register $1_V$ as well as the horizontal shift register $1_H$. However, the whole construction of the imaging device will be readily understood by referring to FIG. 1.

As seen from FIG. 3, the characterizing feature of this invention resides in that a D.C. power source 8 separate from the operating power source 104 of the shift register is connected between ground and a common potential line (earth line) 81 of the horizontal shift register $1_H$ and the vertical shift register $1_V$ (a substrate in the case where the shift registers are formed of an integrated circuit), thereby to shift the potential level of the line 81 by a predetermined potential with respect to ground potential.

In order to more clarify the advantageous effects of this invention based on the novel construction as described above, there will be firstly explained an operation in the case where the power source 8 is not provided, i.e., where the line 81 is directly grounded.

The photodiode $2_{11}$ equivalently has a parasitic capacity 91 across both the terminals thereof. When no light falls on the photodiode $2_{11}$, the voltage across both the terminals of the parasitic capacity 91 is held at a value substantially equal to the voltage of the power source 6. When light falls on the photodiode $2_{11}$, a current flows therethrough, stored charges in the capacity 91 are gradually neutralized, and the voltage across both the terminals of the capacity 91 changes. A stray capacity 92 exists between ground and a line 82 which couples the switching transistors $3_{11}$ and 41. The capacitance $C_2$ of this stray capacity 92 is one or more orders larger than the capacitance $C_1$ of the capacity 91. Accordingly, when the pulse from an output terminal $11_V$ of the first stage of the vertical shift register $1_V$ is applied to the MOS FET $3_{11}$ to render it conductive, the charges of the capacity 91 shift to the stray capacity 92. Further, when the output pulse from an output terminal $11_H$ of the first stage of the horizontal shift register $1_H$ is applied to the MOS FET 41 to render it conductive, a current flows through the load resistance 5 owing to a voltage of value equal to the difference between the voltage across both the terminals of the stray capacity 92 and the voltage of the power source 6. In consequence, a signal corresponding to the quantity of incident light on the photodiode $2_{11}$ is taken out from an output terminal 9.

While the MOS FET's $3_{11}$ and 41 are kept conductive, the voltage is supplied to the capacity 91 from the power source 6 again, and the voltage across the terminals of the capacity 91 becomes substantially equal to the supply voltage.

As understood from the above description, the dynamic range of the photodiode for the quantity of incident light, that is, the range in which the photodiode operates effectively is determined by the quantity of charges which can be stored in the parasitic capacity 91. More specifically, if the storing quantity of charges of the capacity 91 is small, the charges will be completely neutralized by the current flowing through the photodiode $2_{11}$, and the potential of the capacity 91 will become unchangeable for quantities of incident light greater than a certain quantity. The capacitance of the parasitic capacity 91 is determined by design conditions of the photodiode, and hence, in order to increase the storing quantity of charges of the capacity, it is desirable to make the voltage of the power source 6 great.

Since, however, the voltage of the power source 6 is fed to the parasitic capacity 91 through the MOS FET's 41 and $3_{11}$, voltages greater than a fixed value cannot be applied to the capacity 91 under the influence of the transistors 41 and $3_{11}$. In other words, however great the voltage of the power source 6 may be made, voltages exceeding a fixed value cannot be supplied to the capacity 91 on account of the characteristics of the MOS FET's. The maximum voltage which can be impressed on the capacity 91 is determined by a voltage $V_O$ applied to the gate of the MOS FET $3_{11}$ as well as 41 and the threshold voltage $V_T$ of the FET. More specifically, however great the voltage of the power source 6 may be made, the maximum voltage which can be impressed on the capacity 91 through the MOS FET's is $(V_O - V_T)$, and actually the voltage applied to the capacity 91 becomes smaller than $(V_O - V_T)$ under the influences of the substrate effect etc.

In order to transmit the greatest possible voltage from the power source 6 to the parasitic capacity 91, the amplitudes of the switching pulses to be applied to the gates of the MOS FET's 41 and $3_{11}$ may be made great. To this end, it is considered to make the voltage of the operating power source 104 of the shift register great so as to make the amplitudes of the output pulses of the shift registers $1_V$ and $1_H$ great. However, when the output pulse amplitudes of the shift registers $1_V$ and $1_H$ are increased, spiky noises which develop in an output line 83 through a stray capacitance increase to become a cause for conspicuously lower picture quality. Considering such a point, the output pulse amplitude of the shift register is usually selected to be approximately 9 volts. Since the threshold voltage of the MOS FET's 41 and $3_{11}$ is approximately 3–4 volts, the voltage which can be applied from the power source 6 to the capacity 91 is only approximately 5–6 volts at most.

Figure 4A:
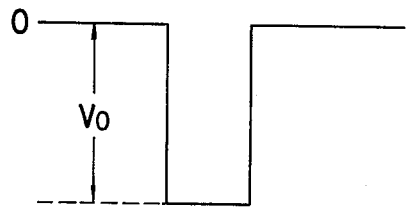
FIGS. 4A and 4B are diagrams showing output pulse waveforms of shift registers.
Figure 4B:
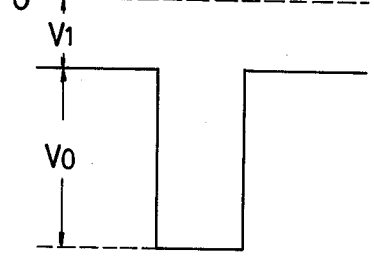

In contrast, in accordance with this invention, the D.C. power source 8 is interposed between ground and the common line 81 of the shift registers $1_V$ and $1_H$, and hence, the waveform which appears at the output terminals (e.g., $11_V$ and $11_H$) of the shift registers $1_V$ and $1_H$ is as shown in FIG. 4B, wherein $V_1$ denotes the voltage of the power source 8. That is, the potential of the common potential line 81 of the shift registers $1_V$ and $1_H$ is shifted by $V_1$ volts in the negative direction, and the output pulse of the shift register undergoes a level shift of $V_1$ volts in comparison with the case of the prior art (FIG. 4A). As the result, pulses of an amplitude of $(V_O + V_1)$ volts are equivalently applied to the gates of the switching MOS FET's $3_{11}$ and 41 in FIG. 3. According to this invention, therefore, the maximum voltage which can be impressed across both the terminals of the parasitic capacity 91 through the MOS FET's 41 and $3_{11}$ from the power source 6 becomes $(V_O + V_1 - V_T)$.

Now, when the value $V_1$ is selected to 3–4 volts substantially equal to $V_T$, the voltage which can be applied from the power source 6 to the capacity 91 becomes approximately $V_O$ volts and is usually 9 volts or so.

The great feature of this invention stated above is that, notwithstanding the fact that the amplitude of the voltages applied to the gates of the switching MOS FET's $3_{11}$ and 41 has equivalently risen to $(V_O+V_1)$ volts, the amplitude of the pulses themselves is $V_O$ volts as in the case of the prior art. Since the amplitude $V_O$ of the pulses themselves is the same as in the prior art, the periodic spike noises which appear at the output terminal 9 through the stray capacitances between the output line of the shift register and the lines 82, 83 etc. do not become greater than that found in the prior art. Simultaneously, the amplitude $(V_O+V_1)$ of the voltages impressed on the gates of the switching MOS FET's is great, so that the voltage which can be supplied across both the terminals of the capacity 91 from the D.C. power source 6 can be made greater than in the prior art. In consequence, the quantity of charges which are stored in the capacity 91 increases, and the dynamic range of the photodiode for the quantity of incident light can be expanded.

Although a preferred embodiment of this invention has been described above, it is to be understood that a variety of modifications can be made without departing from the fundamental feature of this invention. For example, between a case where the MOS field effect transistors employed as the switching FET's 41, 42, 43 ... and 3 are of the p-channel type and a case where they are of the n-channel type, the polarities of the pulses to be impressed on the gates thereof are opposite, and the polarities of the power source 8 are also opposite. The shift registers used as the vertical and horizontal scanning circuits of this invention need not be always of this type as shown in FIG. 2, but other shift register circuits of a type heretofore known can also be adopted.

Further, as stated previously, showing the embodiment of this invention shown in FIG. 3 depicts, for the sake of convenience in illustration, only one diode in the photodiode array and the switching circuit connected thereto. Needless to say, however, the other photodiodes also are connected to the output terminals of the register stages corresponding to the coordinates of the respective diodes in the horizontal and vertical shift registers through the respective MOS FET's as in FIG. 3.

We claim:
1. A solid-state imaging device comprising:
 (a) a photosensor array including a large number of photosensitive elements arranged in rows and columns into the form of a matrix;
 (b) first and second shift register means for generating scanning pulses for scanning said photosensor array in the horizontal and vertical directions, respectively;
 (c) load circuit means for deriving output signals from the respective photosensitive elements of said photosensor array, including a first D.C. power source;
 (d) a plurality of switching circuits connected between said respective photosensitive elements and said load circuit, said switching circuits being selectively switched by the scanning pulses in the horizontal and vertical directions as supplied from said first and second shift registers; and
 (e) level shifting means for shifting the level of said scanning pulses with respect to ground including a second D.C. power source connected between ground and a common potential line to be connected to ground in each of said first and second shift register means.

2. A solid-state imaging device according to claim 1, wherein said switching circuits comprise a first group of switching elements on which switching pulses are impressed from said horizontal shift register and which serve to select the photosensitive elements of one column of said photosensor array, and a second group of switching elements on which switching pulses are impressed from said vertical shift register and which serve to select the photosensitive elements of one row of said photosensor array.

3. A solid-state imaging device according to claim 2, wherein each element in said first and second groups of switching elements is a MOS field effect transistor.

4. A solid-state imaging device according to claim 3, wherein said second D.C. power source supplies a D.C. voltage which is substantially equal to the threshold voltage of the MOS field effect transistor.

* * * * *